United States Patent [19]

Taniuchi et al.

[11] Patent Number: 4,883,843

[45] Date of Patent: Nov. 28, 1989

[54] IMIDE BOND-CONTAINING RESINS AND FLAME RETARDANTS COMPRISING SAID RESINS

[75] Inventors: Akira Taniuchi; Hirohito Komori; Koichi Niwa, all of Kyoto, Japan

[73] Assignee: Dai-Ichi Kogyo Seiyaku Co., Ltd., Kyoto, Japan

[21] Appl. No.: 300,406

[22] Filed: Jan. 23, 1989

[30] Foreign Application Priority Data

Jan. 29, 1988 [JP] Japan ................................. 63-19843

[51] Int. Cl.$^4$ .............................................. C08F 8/32
[52] U.S. Cl. ............................... 525/327.6; 525/326.8; 525/327.4; 525/333.6; 525/359.2; 525/382; 525/386
[58] Field of Search ...................... 525/382, 359.4, 386, 525/327.6, 327.4, 326.8, 359.2, 333.6

[56] References Cited

U.S. PATENT DOCUMENTS 3,104,235 9/1963 Kuntz et al. ...................... 525/359.2
4,059,545 11/1977 Corbett et al. ...................... 524/371

Primary Examiner—Joseph L. Schofer
Assistant Examiner—T. McDonald, Jr.
Attorney, Agent, or Firm—Jordan and Hamburg

[57] ABSTRACT

The invention relates to a method of producing imide bond-containing resins and flame retardants comprising such resins. The method comprises subjecting a halogenated phthalic anhydride, a specific copolymer and a diamine to dehydration reaction in an inert solvents to give an imide bond-containing resin. The resins provide flammable substances with good fire or flame resistance and at the same time themselves have good heat resistance and weather resistance. Therefore, the flame retardants comprising these resins have a wide field of application.

2 Claims, No Drawings

IMIDE BOND-CONTAINING RESINS AND FLAME RETARDANTS COMPRISING SAID RESINS

BACKGROUND OF THE INVENTION

This invention relates to a method of producing imide bond-containing resins and flame retardants comprising said resins.

Recent years have seen a constant and remarkable expansion of the field of applications of plastics. The characteristics required of plastic materials have become diversified accordingly. In particular, fire and flame resistance is a characteristic required of plastics to be used in a very great number of applications, for example as building materials, materials for electric appliances, and automobile parts, among others. The role of flame retardants, which provide plastics with fire or flame resistance, is very important.

Such flame retardants are required not only to be able to provide plastics with good fire or flame resistance without impairing the intrinsic physical properties of the plastics but also to have, by themselves, good heat resistance and weather resistance.

Under such circumstances, certain flame retardants comprising imide bond-containing resins have attracted recent attention but are not fully satisfactory as yet.

SUMMARY OF THE INVENTION

Accordingly, it is an object of the invention to provide a method of producing imide bond-containing resins not only capable of providing plastics with good fire or flame resistance without impairing the physical properties of the plastics but also themselves having good heat resistance and weather resistance. A further object is to provide flame retardants comprising said resins.

The invention thus provides a method of producing imide bond-containing resins of the general formula

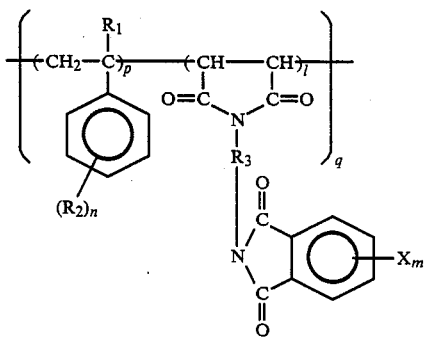

wherein $R_1$ is H or $CH_3$, $R_2$ is H, Cl, Br, F or $CH_3$, $R_3$ is a straight or branched alkylene group containing 1 to 6 carbon atoms or an aromatic nucleus, X is Br, Cl or F, $l$ is equal to 1, m is an integer of 1 to 4, n is an integer of 1 to 5, p is an integer of 1 to 4 and q is a number equal to 1 to 100, which comprises subjecting a halogenated phthalic anhydride of the general formula

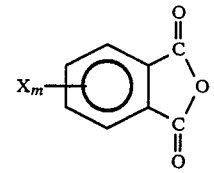

wherein X and m are as defined above, a copolymer of the general formula

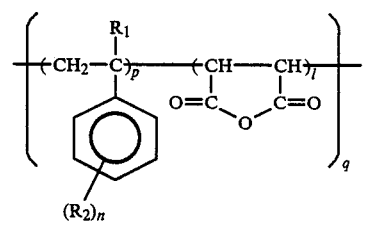

wherein $R_1$, $R_2$, $l$, n, p and q are as defined above, and a diamine of the general formula $$H_2N—R_3—NH_2 \qquad (3)$$

wherein $R_3$ is an defined above, to dehydration reaction in an inert solvent as well as flame retardants comprising said resins.

DESCRIPTION OF PREFERRED EMBODIMENTS

The halogenated phthalic anhydride of general formula (1) to be used in the practice of the invention is, for example, tetrachlorophthalic anhydride, tetrabromophthalic anhydride, dichlorophthalic anhydride or dibromophthalic anhydride.

The copolymer of general formula (2) is, for example, a styrene-maleic anhydride copolymer (comonomer mole ratio=1:1 to 4:1), an α-methylstyrene-maleic anhydride copolymer (comonomer mole ratio=1:1 to 4:1), a chlorostyrene-maleic anhydride copolymer or a bromostyrene-maleic anhydride copolymer.

The diamine of general formula (3) is, for example, ethylenediamine, hexamethylenediamine, phenylenediamine, 4,4'-diaminodiphenylmethane, 4,4'-diaminodiphenyl sulfone, propylenediamine or xylenediamine.

The inert solvent to be used in the practice of the invention is, for example, xylene, toluene, dimethylformamide, dimethylacetamide, benzene, cyclohexane or dimethyl sulfoxide, or a mixture of two or more of such solvents.

The method of producing imide bond-containing resins of general formula (4) as provided by the present invention consists in subjecting the above-mentioned halogenated phthalic anhydride of general formula (1), the above-mentioned copolymer of general formula (2) and the above-mentioned diamine of general formula (3) to dehydration reaction in the inert solvent.

The reaction may be illustrated as follows:

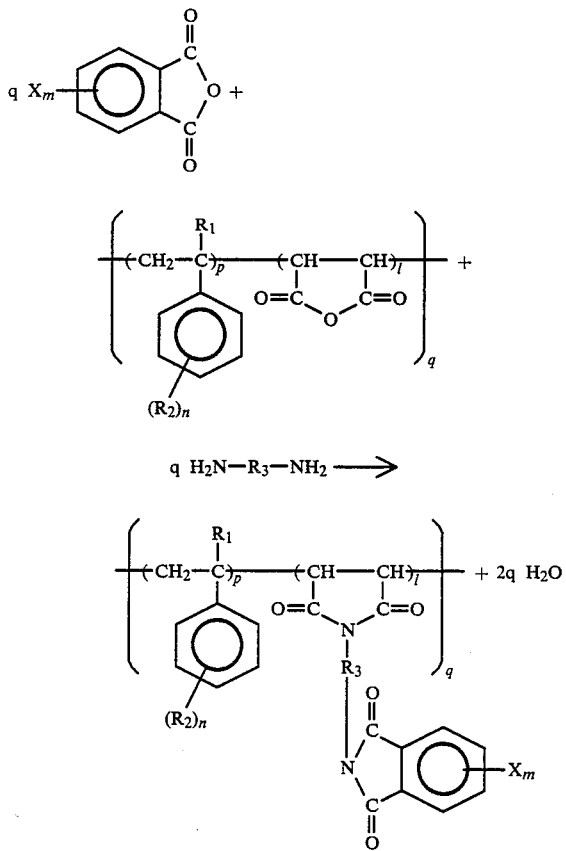

Thus, the above three reactants, namely halogenated phthalic anhydride of general formula (1), copolymer of general formula (2) and diamine of general formula (3), each in a stoichiometric amount, are reacted together in the inert solvent. The reaction is complete when the stoichiometric amount of water has been distilled off. In a specific embodiment, a mixture of the halogenated phthalic anhydride of general formula (1) and the copolymer of general formula (2) is dissolved in the inert solvent. Then, the diamine of general formula (3) is added dropwise to the solution with stirring. On this occasion, the temperature is maintained at 60°–150° C. After completion of the dropping of the diamine of general formula (3), the reaction is allowed to proceed with continued stirring while the reaction system is maintained at 100°–150° C. After the quantity of the distillate water has arrived at an expected level, the inert solvent is distilled off under reduced pressure, and the reaction product is washed with water and further washed well with 5% aqueous ammonia or an aqueous caustic alkali solution and then dried to give an imide bond-containing resin representable by the above general formula (4).

The flame retardants according to the invention each contains, as a flame retardant component, the imide bond-containing resin of general formula (4) as obtained in the above manner.

The flame retardants according to the invention are excellent additive-type flame retardants for use in general-purpose resins, such as polystyrene resins, polyethylene resins, polypropylene resins, acrylic resins, vinyl chloride resins, saturated or unsaturated polyester resins, melamine resins, epoxy resins and phenol resins, as well as in engineering plastics, such as ABS resins, polyphenylene oxide resins, polycarbonate resins and polyamide resins. They are also suited for use in the aqueous dispersion form in treating fibers, latices and so forth for providing them with fire or flame resistance.

The flame retardants according to the invention may be used in combination with conventional halogen-containing flame retardants and/or phosphorus-containing flame retardants; stabilizers, such as triphenyl phosphite; antioxidants; antistatic agents; auxiliary flame retardants, such as antimony trioxide; fillers, such as molybdenum oxide, talc, calcium carbonate, barium sulfate, titanium oxide and inorganic fibers; plasticizers; pigments; crosslinking agents, such as dicumyl peroxide; and so forth. The combined use of an auxiliary flame retardant, such as antimony trioxide, is particularly preferred.

The level of addition of the flame retardants according to the invention should be selected suitably depending on the kind of plastic to which they are added. Generally, however, said flame retardants are used preferably in an amount of 0.2–30% by weight. The method of addition is optional. For example, the flame retardants according to the invention are added to plastics, either as such or in the form of a solution in a solvent or of a dispersion or emulsion in water or in an oil.

When the production method according to the invention is employed, the imide bond-containing resins of general formula (4) can be obtained in high yields. Furthermore, the imide bond-containing resins of general formula (4) as provided by the invention can provide flammable substances with good fire or flame resistance and at the same time they themselves have remarkable heat resistance and good weather resistance. Therefore, the flame retardant comprising such resins can be used in a wide field.

The following examples illustrate the invention in further detail. However, they are by no means limitative of the scope of the invention.

EXAMPLE 1

A four-necked flask equipped with a stirrer, a cooling condenser, a thermometer and a dropping funnel was charged with 20.2 g of a styrene-maleic anhydride copolymer (comonomer mole ratio=1:1; average molecular weight-1,000), 46.4 g of tetrabromophthalic anhydride, 200 g of xylene and 100 g of dimethylformamide, and the contents were stirred with heating at 80°–100° C. After dissolution of the contents, 6.0 g of ethylenediamine was added dropwise to the solution. After completion of the dropping, the flask contents were stirred with heating at 120°–135° C. Four grams of distillate water was trapped over 4 hours. Then, the xylene and dimethylformamide were distilled off under reduced pressure. The remaining reaction product was washed with warm water (80° C.), and then with a mixture of 200 ml of water and 20 g of 28% aqueous ammonia. After collection by filtration, the product was washed with water. After further washing with 200 ml of methanol and collection by filtration, the product was dried. Thus was obtained 63 g (yield 91.3%) of an imide bond-containing resin. This resin had a structure such that, in general formula (4), $R_1=H$, $R_2=H$, $R_3=$—$CH_2$—$CH_2$—, $X=Br$, $l=1$, $m=4$, $n=1$, $p=1$ and $q=4.95$.

The elemental analysis and DTA (differential thermal analysis) data obtained with the above resin are shown below.

Elemental analysis: Br %: 43.80 (46.38), C %: 34.11 (34.78), H %: 1.40 (1.45), O %: 9.32 (9.28), N %: 3.95 (4.06).

Hereinabove and hereinafter, the numerical values in the parentheses are calculated values, as far as elemental analysis data are concerned.

DTA analysis: 10% weight loss: 382° C. 50% weight loss: 468° C.

EXAMPLE 2

The same reaction apparatus as used in Example 1 was charged with 46.4 g of a bromostyrene-maleic anhydride copolymer (comonomer mole ratio=2:1; average molecular weight=2,000), 46.4 g of tetrabromophthalic anhydride, 400 g of xylene and 200 g of dimethylformamide, and the contents were stirred with heating at 80°–100° C. After dissolution of the contents, 6.0 g of ethylenediamine was added dropwise to the solution. After completion of the dropping, the flask contents were stirred with heating at 120°–135° C. Four grams of distillate water was trapped over 5 hours. The xylene and dimethylformamide were then distilled off under reduced pressure. The remaining reaction product was washed with a mixture of 200 ml of water and 30 g of 28% aqueous ammonia, collected by filtration, and washed with warm water (80° C.). The product was further washed with 400 ml of methanol, collected by filtration, and dried. Thus was obtained 90 g (yield 94.5%) of an imide bond-containing resin. This resin had a structure such that, in general formula (4), $R_1=H$, $R_2=Br$, $R_3=-CH_2-CH_2-$, $X=Br$, $l=1$, $m=4$, $n=1$, $p=2$ and $q=4.31$.

The elemental analysis and DTA analysis data obtained with the above resin are shown below.

Elemental analysis: Br %: 50.22 (50.42), C %: 37.63 (37.82), H %: 2.03 (2.10), O %: 6.80 (6.72), N %: 2.88 (2.94).

DTA analysis: 10% weight loss: 390° C. 50% weight loss: —.

EXAMPLE 3

The same apparatus as used in Example 1 was charged with 20.2 g of a styrene-maleic anhydride copolymer (comonomer mole ratio=1:1; average molecular weight=3,000), 46.4 g of tetrabromophthalic anhydride, 300 g of xylene and 200 g of dimethylformamide, and the contents were stirred with heating at 80°–100° C. After dissolution of the contents, 10.8 g of p-phenylenediamine was added dropwise to the solution. After completion of the dropping, the flask contents were stirred with heating at 120°–140° C. Four grams of distillate water was trapped over 6 hours. Thereafter, the reaction product was purified in the same manner as in Example 1. After drying, there was obtained 69.2 g (yield 93.7%) of an amide bond-containing resin. This resin had a structure such that, in general formula (4), $R_1=H$, $R_2=H$, $R_3=$p-phenylene, $X=Br$, $l=1$, $m=4$, $n=1$, $p=1$ and $q=14.85$.

The elemental analysis and DTA analysis data for the above resin are shown below.

Elemental analysis: Br %: 43.10 (43.36), C %: 42.21 (42.28), H %: 1.24 (1.22), O %: 8.61 (8.67), N %: 3.75 (3.79).

DTA analysis: 10% weight loss: 395° C. 50% weight loss: —.

EXAMPLE 4

One hundred parts by weight of high impact polystyrene (Nippon Steel Chemical's ESTYRENE® H65) and 20 parts by weight of the imide bond-containing resin obtained in Example 1 were kneaded together on a hot roll mill at 200° C. for 5 minutes and then hot-pressed at 210° C. for 2 minutes for molding. Specimens, 1/16 inch in thickness, were prepared from the molding in accordance with UL 94 (Underwriters Laboratories Inc. Standard for Tests for Flammability of Plastic Materials) and the burning test was performed.

The duration of flaming (duration of burning with flaming combustion) was 20.0 seconds and the duration of glowing (duration of glowing combustion without flaming) was 5.0 seconds, and the molding was thus classed 94V-2 according to UL 94. Slight dripping was observed.

EXAMPLE 5

A mixture of 100 parts by weight of the same high impact polystyrene as used in Example 4, 15 parts by weight of the imide bond-containing resin obtained in Example 1 and 5 parts by weight of antimony trioxide was kneaded and molded in the same manner as in Example 4. The molding was tested for flammability in the same manner as in Example 4.

The duration of flaming was 4.8 seconds and the duration of glowing was 6.6 seconds, hence the molding was classed 94V-0 according to UL 94. No dripping was observed.

EXAMPLE 6

A mixture of 100 parts by weight of the same high impact polystyrene as used in Example 4, 15 parts of the imide bond-containing resin obtained in Example 1 or Example 3, 2 parts by weight of triphenyl phosphite and 5 parts by weight of antimony trioxide was kneaded and molded in the same manner as in Example 4. The molding was tested for flammability in the same manner as in Example 4. The results obtained are shown below.

| Imide bond-containing resin used | Duration of flaming (seconds) | Duration of glowing (seconds) | UL 94 |
| --- | --- | --- | --- |
| Example 1 | 4.5 | 5.0 | Classed 94V-O |
| Example 3 | 6.2 | 5.8 | Classed 94V-O |

No dripping was observed in either case.

EXAMPLE 7

A mixture of 100 parts by weight of an ABS resin, 15 parts by weight of the imide bond-containing resin obtained in Example 2, 2 parts by weight of triphenyl phosphite and 5 parts by weight of antimony trioxide was kneaded and molded in the same manner as in Example 4. The molding was tested for flammability in the same manner as in Example 4.

The duration of flaming was 5.8 seconds and the duration of glowing was 4.1 seconds, hence the molding was classed 94V-0 according to UL 94. No dripping was observed.

We claim:

1. A flame retardant which comprises an imide bond-containing resin of the general formula

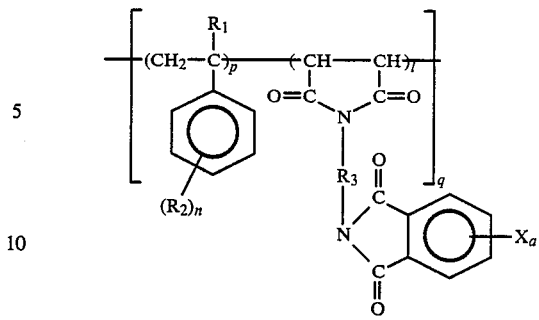
wherein $R_1$ is H or $CH_3$, $R_2$ is H, Cl, Br, F or $CH_3$, $R_3$ is a straight or branched alkylene group containing 1 to 6 carbon atoms or an aromatic nucleus, X is Br, Cl or F, l is equal to 1, m is an integer of 1 to 4, n is an integer of 1 to 5, p is an integer of 1 to 4 and q is a number equal to 1 to 100.
2. A flame retardant in claim 1, which further comprises an auxiliary flame retardant.
* * * * *